(12) United States Patent
Malkhi et al.

(10) Patent No.: US 11,341,122 B2
(45) Date of Patent: *May 24, 2022

(54) BYZANTINE FAULT TOLERANCE THAT SUPPORTS HETEROGENEOUS CLIENTS

(71) Applicant: VMware, Inc., Palo Alto, CA (US)

(72) Inventors: Dahlia Malkhi, Palo Alto, CA (US); Kartik Ravidas Nayak, Santa Clara, CA (US); Ling Ren, Menlo Park, CA (US)

(73) Assignee: VMware, Inc., Palo Alto, CA (US)

( * ) Notice: Subject to any disclaimer, the term of this patent is extended or adjusted under 35 U.S.C. 154(b) by 316 days.

This patent is subject to a terminal disclaimer.

(21) Appl. No.: 16/520,898

(22) Filed: Jul. 24, 2019

(65) Prior Publication Data

US 2021/0026843 A1 Jan. 28, 2021

(51) Int. Cl.
*G06F 16/23* (2019.01)
*G06Q 20/38* (2012.01)
*G06F 16/27* (2019.01)

(52) U.S. Cl.
CPC ........ *G06F 16/2379* (2019.01); *G06F 16/275* (2019.01); *G06Q 20/38* (2013.01)

(58) Field of Classification Search
CPC .... G06F 16/2379; G06F 16/275; G06Q 20/38
(Continued)

(56) References Cited

U.S. PATENT DOCUMENTS 6,671,821 B1 12/2003 Castro et al.
7,334,154 B2 2/2008 Lorch et al.
(Continued)

FOREIGN PATENT DOCUMENTS

CN 108492103 A 9/2018
JP 6731123 B1 7/2020
(Continued)

OTHER PUBLICATIONS

Abraham, I. et al. "Synchronous Byzantine Agreement with Expected O(1) Rounds, Expected O(n2) Communication, and Optimal Resilience," In: Financial Cryptography and Data Security, 2019, pp. 320-334.
(Continued)

*Primary Examiner* — Michelle N Owyang
*Assistant Examiner* — Shirley D Hicks
(74) *Attorney, Agent, or Firm* — Kim & Stewart LLP

(57) ABSTRACT

A replicated service comprises N replicas deployed on compute nodes of a computer network, wherein the replicas are each configured to vote on a proposed transaction output by a leader of the replicas and certify the proposed transaction upon receiving qr*N first votes, where qr is a fractional value between 0 and 1 that represents a quorum required for certification. A method of approving a transaction in the replicated service includes receiving certifications (Continued)

from the replicas, and transmitting an approval of the transaction to the replicas for recording: (i) upon determining that at least qc*N certifications have been received, where qc is a fractional value between 0 and 1 that represents a quorum required for transaction approval and qc>qr, or (ii) upon determining that at least qr*N certifications have been received at the end of the time period equal to 2*Δ, where Δ represents a network delay.

20 Claims, 10 Drawing Sheets

(58) Field of Classification Search
USPC .................................................. 707/600–899
See application file for complete search history.

(56) References Cited

U.S. PATENT DOCUMENTS

| 8,132,073 | B1 | 3/2012 | Bowers et al. |
| 8,255,373 | B2 | 8/2012 | McKelvie et al. |
| 2010/0037056 | A1 | 2/2010 | Follis et al. |
| 2012/0150802 | A1 | 6/2012 | Popov et al. |
| 2018/0198626 | A1* | 7/2018 | Kroonmaa ............... G06F 16/27 |
| 2019/0243963 | A1 | 8/2019 | Soriente et al. |
| 2019/0251199 | A1* | 8/2019 | Klianev ............... G06F 11/1438 |
| 2019/0258610 | A1 | 8/2019 | Dang et al. |
| 2019/0354518 | A1* | 11/2019 | Zochowski ......... G06F 16/2379 |
| 2019/0377645 | A1 | 12/2019 | Abraham et al. |

FOREIGN PATENT DOCUMENTS

| WO | 2017/179059 A1 | 10/2017 |
| WO | 2018/095540 A1 | 5/2018 |
| WO | 2019/014337 A1 | 1/2019 |
| WO | 2019/101244 A2 | 5/2019 |

OTHER PUBLICATIONS

Abraham, I. et al. "Sync HotStuff: Simple and Practical Synchronous State Machine Replication," Cryptology ePrint Archive, Report 2019/270, 2019, 17 pages.

Aiyer, A. et al. "BAR Fault Tolerance for Cooperative Services," Proceedings of the Twentieth ACM Symposium on Operating Systems Principles (SOSP '05), Brighton, United Kingdom, Oct. 23-26, 2005, pp. 45-58.

Castro, M. et al. "Practical Byzantine Fault Tolerance," Proceedings of the Third Symposium on Operating Systems Design and Implementation, New Orleans, USA, Feb. 1999, pp. 1-14.

Hanke, T. et al. "DFINITY Technology Overview Series Consensus System," arXiv preprint arXiv: 1805.04548, May 11, 2018, 16 pages.

* cited by examiner

BYZANTINE FAULT TOLERANCE THAT SUPPORTS HETEROGENEOUS CLIENTS

BACKGROUND

Byzantine fault tolerant (BFT) protocols are used to build replicated services. Recently, they have received revived interest as the algorithmic foundation of what are known as decentralized ledgers, or blockchains, such as those used for BitCoin transactions.

In conventional approaches to BFT protocol designs, a protocol designer or a service administrator first picks a set of assumptions (e.g., the fraction of Byzantine faults and certain timing assumptions) and then devises a protocol (or chooses an existing one) tailored for the particular set of assumptions. The assumptions made by the protocol designer are imposed upon all parties involved, including every replica maintaining the service as well as every client using the service. Such a protocol collapses if deployed under a set of assumptions that differ from the one it is designed for. In particular, optimal-resilience partially synchronous solutions completely break down and provide inaccurate results if the fraction of Byzantine faults exceeds ⅓. Similarly, optimal-resilience synchronous solutions break down and provide inaccurate results if the fraction of Byzantine faults exceeds ½ or if the synchrony bound is violated.

BFT protocols operate within a replicated service that takes requests from clients and provides clients an interface of a single non-faulty server, i.e., it provides clients with the same totally ordered sequence of values. Internally, the replicated service uses multiple non-faulty servers, also referred to herein as replicas, to tolerate some number of faulty servers. The total number of replicas is denoted by n. When one considers a set of replicas, the set size may be denoted as its fraction over n. For example, a set of m replicas may be referred to as "q replicas" where q=m/n.

Such a replicated service within which BFT protocols may operate has three logical actors: proposers capable of sending new values, acceptors who add these values to a totally ordered sequence (called a blockchain), and learners who decide on a sequence of values based on the transcript of the protocol and execute them on a state machine. Conventional replication protocols provide the following two properties:

(Safety) Any two learners learn the same sequence of values.

(Liveness) A value proposed by a proposer will eventually be executed by every learner.

In conventional BFT protocols, the learners are assumed to be homogeneous, i.e., they interpret a transcript using the same rules and hence decide on the same sequence of values. Conventional BFT protocols are designed to handle a certain number of Byzantine replicas, or Byzantine faults. Byzantine replicas are capable of behaving arbitrarily, such that a Byzantine replica may output one result to one replica in a group of replicas, or it may output a different result to another replica in the group of replicas, or in an attempt to corrupt the replicated service, it may not output any result to yet another replica in the group of replicas.

As stated above, research has shown that, for conventional BFT protocols, partially synchronous network scenarios completely break down and provide inaccurate results if the fraction of Byzantine faults (that is, the fraction of Byzantine replicas) exceeds ⅓. Similarly, synchronous network scenarios break down and provide inaccurate results if the fraction of Byzantine faults exceeds ½ or if the synchrony bound is violated.

SUMMARY

A replicated service comprises N replicas deployed on compute nodes of a computer network, N being a positive integer, wherein the N replicas are each configured to vote on a proposed transaction output by a leader of the N replicas and certify the proposed transaction upon receiving $qr*N$ first votes, where qr is a fractional value between 0 and 1 that represents a quorum required for certification.

A method of approving a transaction in the replicated service according to a first protocol or a second protocol, includes receiving one or more certifications from the N replicas, transmitting an approval of the transaction to the replicas for recording by the replicas, when operating under the first protocol, upon determining that at least $qc*N$ certifications have been received, where qc is a fractional value between 0 and 1 that represents a quorum required for transaction approval and qc>qr, transmitting an approval of the transaction to the replicas for recording by the replicas, when operating under the second protocol, upon determining that at least $qr*N$ certifications have been received at the end of the time period equal to $2*\Delta$, where $\Delta$ represents a network delay between two compute nodes of the computer network.

Transactions that may be approved in accordance with one or more embodiments include crypto-currency transactions, such as Bitcoin transactions, as well as supply chain transactions involving clients such as product manufacturers, retailers, wholesalers, brick-and-mortar stores, purchasers of products. Each of these clients has different needs and different responsibilities associated with a potential transaction, for which their part of the transaction may be approved by way of a replicated service using Flexible BFT according to one or more embodiments to be described in detail hereinbelow. Such a potential transaction may correspond to the sale of 100 pairs of basketball shoes made by a shoe manufacturer (client #1), sold by the shoe manufacturer to a shoe store (retailer, client #2), transported from the shoe manufacturer to the shoe store by a transport company (client #3), to be purchased by a client (Basketball team, client #4).

Further embodiments include, without limitation, a non-transitory computer-readable storage medium that includes instructions for a processor to carry out the above method, and a computer system that includes a processor programmed to carry out the above method.

DETAILED DESCRIPTION

Figure 1:
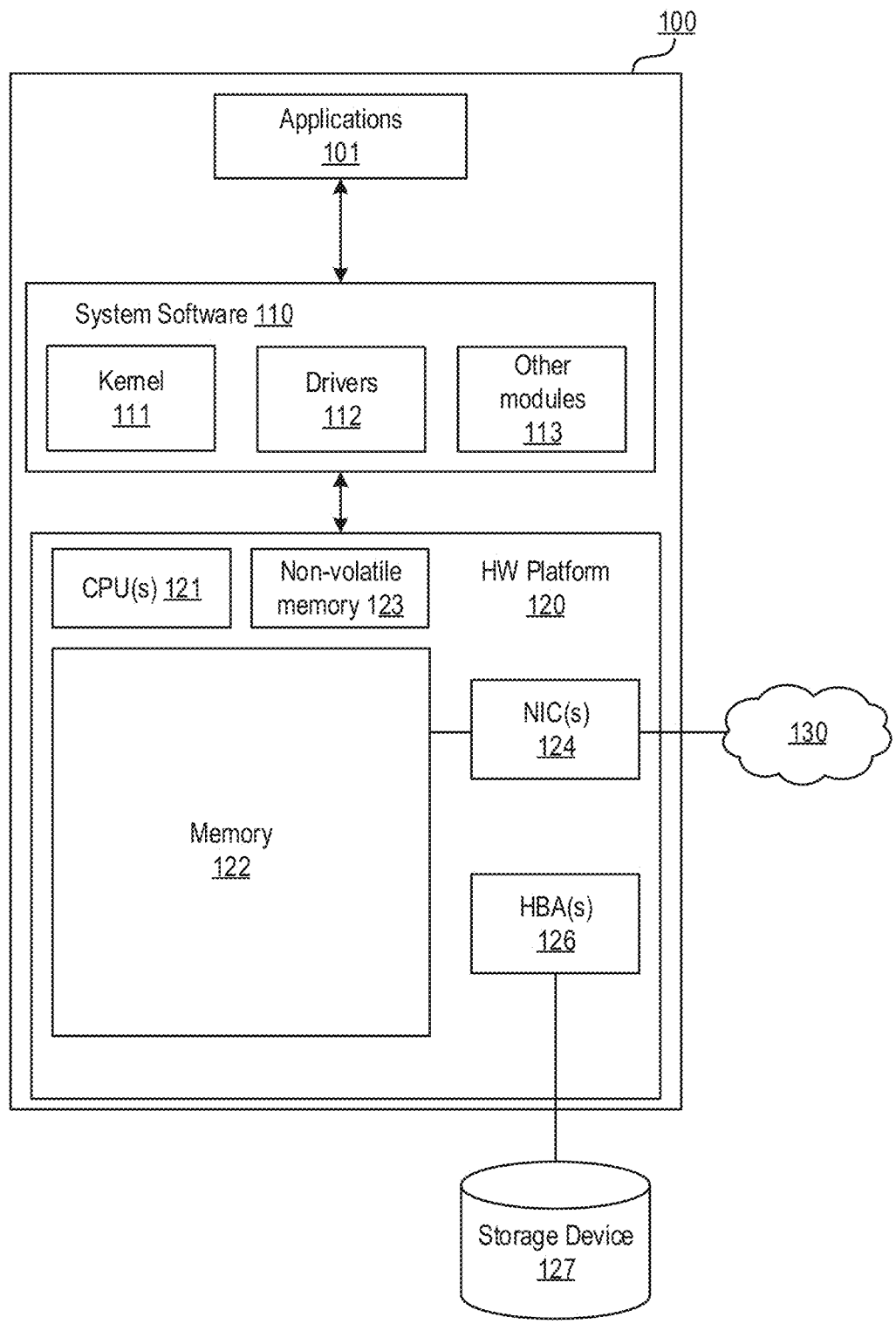
FIG. 1 is a block diagram of a computer system in which one or more embodiments may be implemented.

FIG. 1 is a block diagram of a computer system 100 in which one or more embodiments may be implemented. Computer system 100 includes one or more applications 101 that are running on top of system software 110. System software 110 includes a kernel 111, drivers 112 and other modules 113 that manage hardware resources provided by a hardware platform 120. In one embodiment, system software 110 is an operating system (OS), such as operating systems that are commercially available. In another embodiment, system software 110 is a hypervisor that supports virtual machine applications running thereon, e.g., a hypervisor that is included as a component of VMware's vSphere® product, which is commercially available from VMware, Inc. of Palo Alto, Calif. Hardware platform 120 includes one or more physical central processing units (pCPUs) 121, system memory 122 (e.g., dynamic random access memory (DRAM)), read-only-memory (ROM) 123, one or more network interface cards (NICs) 124 that connect computer system 100 to a network 130, and one or more host bus adapters (HBAs) 126 that connect to storage device(s) 127, which may be a local storage device or provided on a storage area network. Computer system may correspond to a replica in a group of replicas to be described below in which NICs 124 may be used to communicate with other replicas in the group of replicas via network 130, or it may correspond to a client that relies on output from a group of replicas to make a commit decision and that receives information (e.g., votes) from the replicas via the network 130 using NICs 124, according to one or more embodiments.

Figure 2:
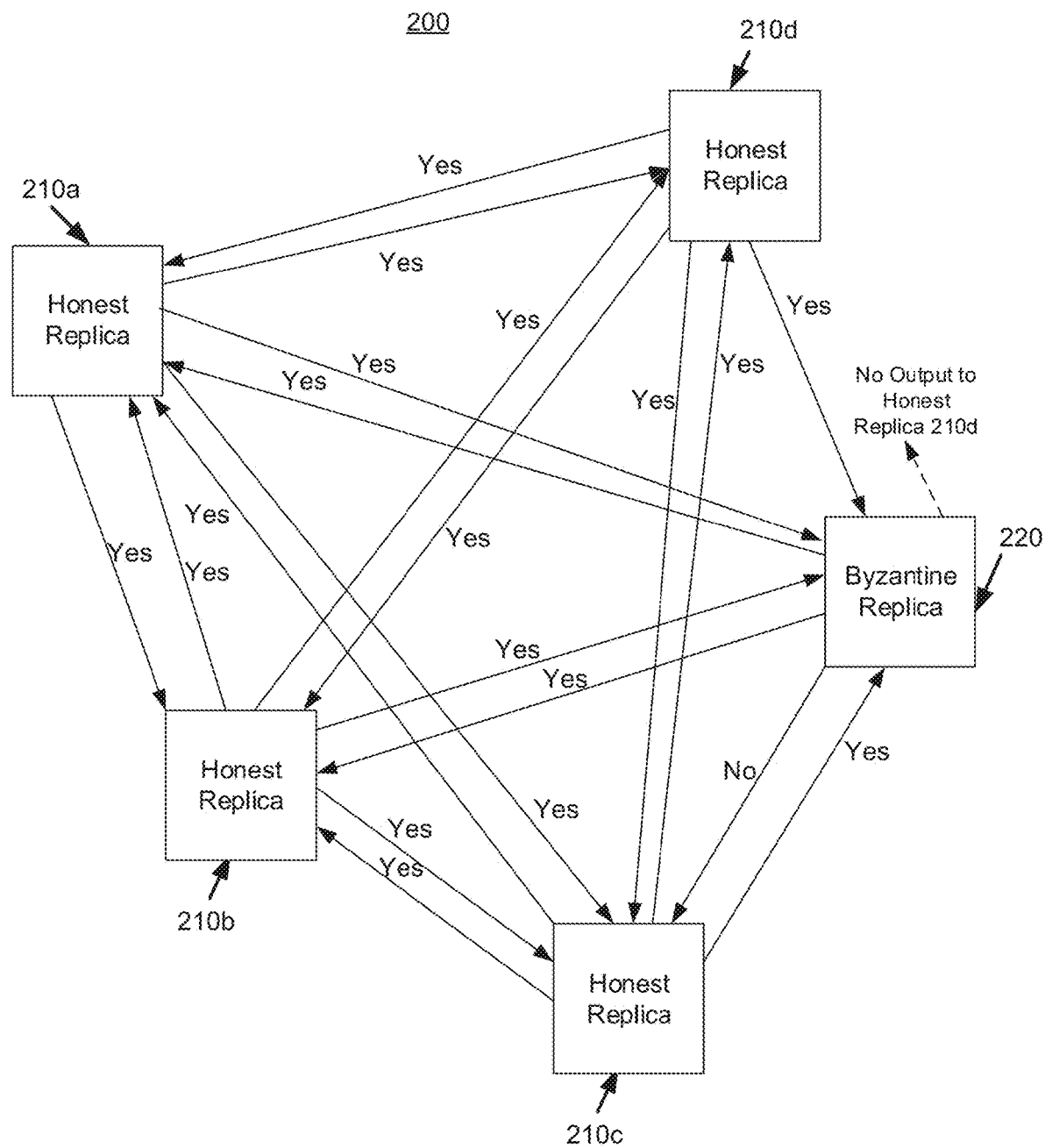
FIG. 2 is a diagram showing a set of replicas in a replicated service that comprises honest replicas and a Byzantine replica.

FIG. 2 is a diagram showing a set of replicas 200 in a replicated service that comprises four honest replicas 210*a*, 210*b*, 210*c*, 210*d* and one Byzantine replica 220 in a group of five (5) replicas, in which a conventional BFT protocol may operate. The four honest replicas 210*a*, 210*b*, 210*c*, 210*d* will not output corrupt information to the other replicas within the group of five replicas. The Byzantine replica 220, in contrast, may output different results to different replicas in the group, and it may also output nothing to one or more replicas in the group. By way of example, honest replicas 210*a*, 210*b*, 210*c*, 210*d* output a consistent result, a vote=Yes, to the other replicas in the group, whereas Byzantine replica 220 outputs a first vote=Yes to replicas 210*a*, 210*b*, a second vote=No to replica 210*c*, and it does not output anything to replica 210*d*. Byzantine replica 220 does this in an attempt to subvert a vote made by the five replicas in a current view, in which a client (not shown in FIG. 2) makes a commit decision based on information provided by the five replicas 210*a*, 210*b*, 210*c*, 210*d*, 220.

Conventional BFT protocols operate in a replicated service such as the one shown in FIG. 2. In more detail, conventional BFT protocols for solving consensus in a partially synchronous setting with optimal ⅓-resilience revolve around voting by Byzantine quorums of replicas. Two properties of Byzantine quorums are utilized for achieving safety and liveness. First, any two quorums intersect at one honest replica, thereby providing quorum intersection. Second, there exists a quorum that contains no Byzantine faulty replicas, thereby providing quorum availability. Concretely, when less than ⅓ the replicas are Byzantine replicas, quorums are set to size $q_r=2/3$. This guarantees an intersection of size at least $2q_r-1=1/3$, hence at least one honest replica in the intersection. As for availability, there exists $q_r=2/3$ honest replicas to form a quorum.

Figure 3:
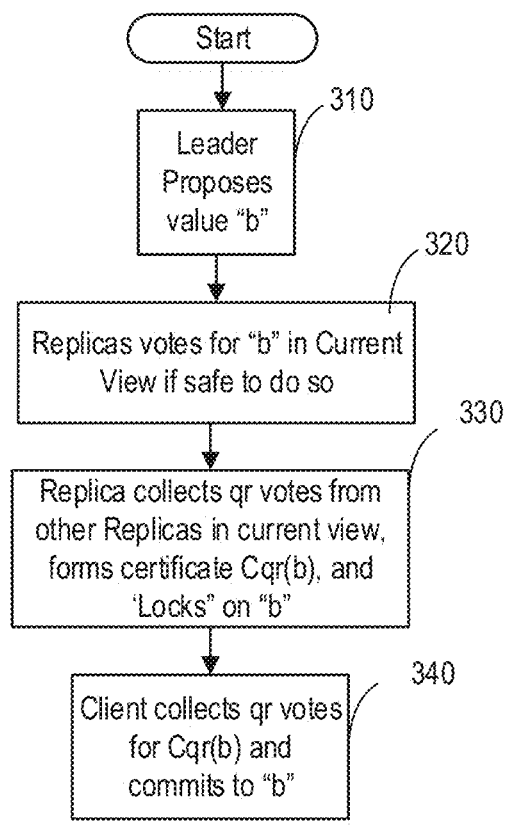
FIG. 3 is a flow diagram of a conventional replicated service BFT protocol that may operate with the set of replicas shown in FIG. 2.

To dissect the use of quorums in conventional BFT protocols, a description is provided herein of the operation of a conventional Practical BFT, or PBFT protocol, which provides safety and liveness. PBFT operates in a view-by-view manner, in which each view has a unique leader and consists of the steps shown in FIG. 3.

In step 310, which corresponds to a 'propose' step, a leader L of the replicas proposes a value b. The value may correspond to a "Yes" or a "No" vote with respect to a transaction attempted to be made by a client, for example. The transaction may be an attempted purchase of a vehicle using crypto-currency, whereby the replicas vote on the transaction with a "Yes" (valid transaction) or a "No" vote (invalid transaction for some reason).

In step 320, a first vote is made by the replicas in a current view. In more detail, on receiving the proposed value b from the leader in step 310, a replica votes for b if it is safe, as determined by a locking mechanism described below. A set of $q_r$ votes forms a certificate $C^{q_r}$ (b).

A replica 'locks' on b, in step 330, on collecting $C^{q_r}$ (b) certificates from other replicas, and votes for $C^{q_r}$ (b).

A client learns, in step 340, on collecting $q_r$ certificates for $C^{q_r}$ (b), that the proposal b becomes a committed decision. If a replica locks on a value b in a view, then it votes only for b in subsequent views unless it "unlocks" from b. A replica "unlocks" from b if it learns that $q_r$ replicas are not locked on b in that view or a future view, since those replicas may be locked on other values or they may not be locked at all.

The properties of Byzantine quorums are harnessed in PBFT for safety and liveness as follows:

Quorum intersection within a view. Safety within a view is ensured by the first round of votes. A replica votes only once per view. For two distinct values to both obtain certificates, one honest replica needs to vote for both, which cannot happen.

Quorum intersection across views. Safety across views is ensured by the locking mechanism. If b becomes a committed decision in a view, then a quorum of replicas lock on b in that view. For an honest replica among them to unlock from b, a quorum of replicas need to claim they are not locked on b. At least one replica in the intersection is honest and would need to falsely claim it is not locked, which cannot happen.

Quorum availability within a view. Liveness within each view is guaranteed by having an honest quorum respond to a non-faulty leader.

Flexible BFT protocol according to one or more embodiments improves on the capabilities of PBFT, by introducing another type of fault or replica, called an alive-but-corrupt fault or an alive-but-corrupt replica. The goal of alive-but-corrupt replicas is to attack safety but to preserve liveness. In deriving Flexible BFT, an assumption is made that the adversary is static, i.e., the adversary determines which replicas are Byzantine and alive-but-corrupt before the start of the protocol. Based on this new alive-but-corrupt fault model developed by the inventors of this application, the safety proof treats alive-but-corrupt replicas similarly to Byzantine replicas. Then, once safety is proved, the liveness proof treats alive-but-corrupt replicas similarly to honest replicas.

Figure 4:
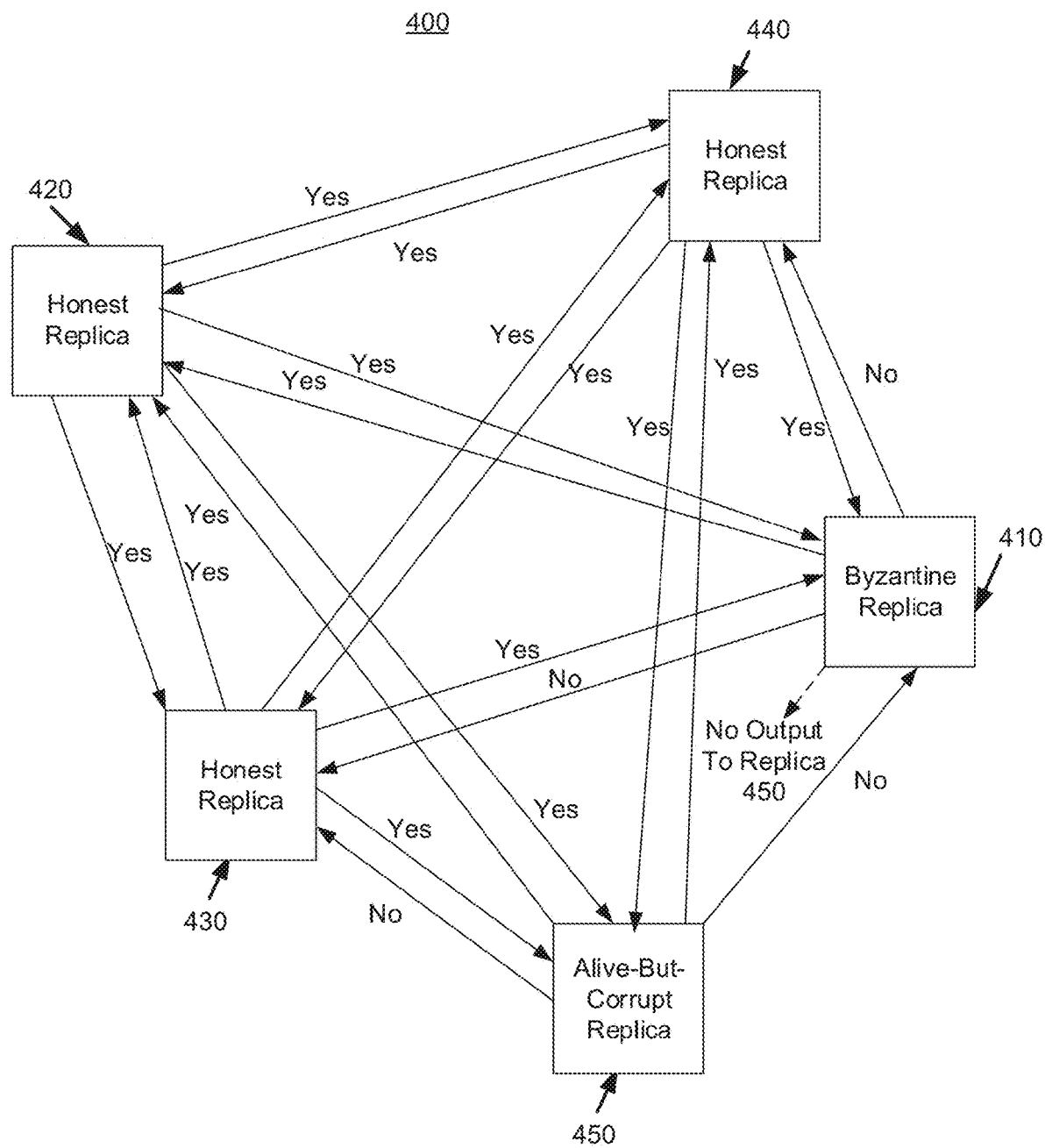
FIG. 4 is a diagram showing a set of replicas in a replicated service that comprises honest replicas, Byzantine replicas, and alive-but-corrupt replicas, in which a Flexible BFT protocol may operate, according to one or more embodiments.

FIG. 4 is a diagram showing a set of replicas 400 in a replicated service that comprises honest replicas, Byzantine replicas, and alive-but-corrupt replicas, in which a Flexible BFT protocol may operate, according to one or more embodiments. In FIG. 4, the set of five replicas includes a Byzantine replica 410, three honest replicas 420, 430, 440 and one alive-but-corrupt replica 450. Byzantine replica 410 is capable of outputting a first result ("Yes") to honest replica 420, a second result ("No") different from the first result to honest replica 430 and to the honest replica 440, and no result to alive-but-corrupt replica 450. Honest replicas 420, 430, 440 only output honest results, in this case "Yes", to the other replicas in the group of replicas. Alive-but-corrupt replicas 450 outputs a first result "No" to Byzantine replica 410 and to honest replica 430, and a second result "Yes" to honest replica 420 and honest replica 440. Note that alive-but-corrupt replica 450 must output a result to the other replicas, unlike the Byzantine replica 410 that may not output a result to one or more of the other replicas in a view.

Figure 5:
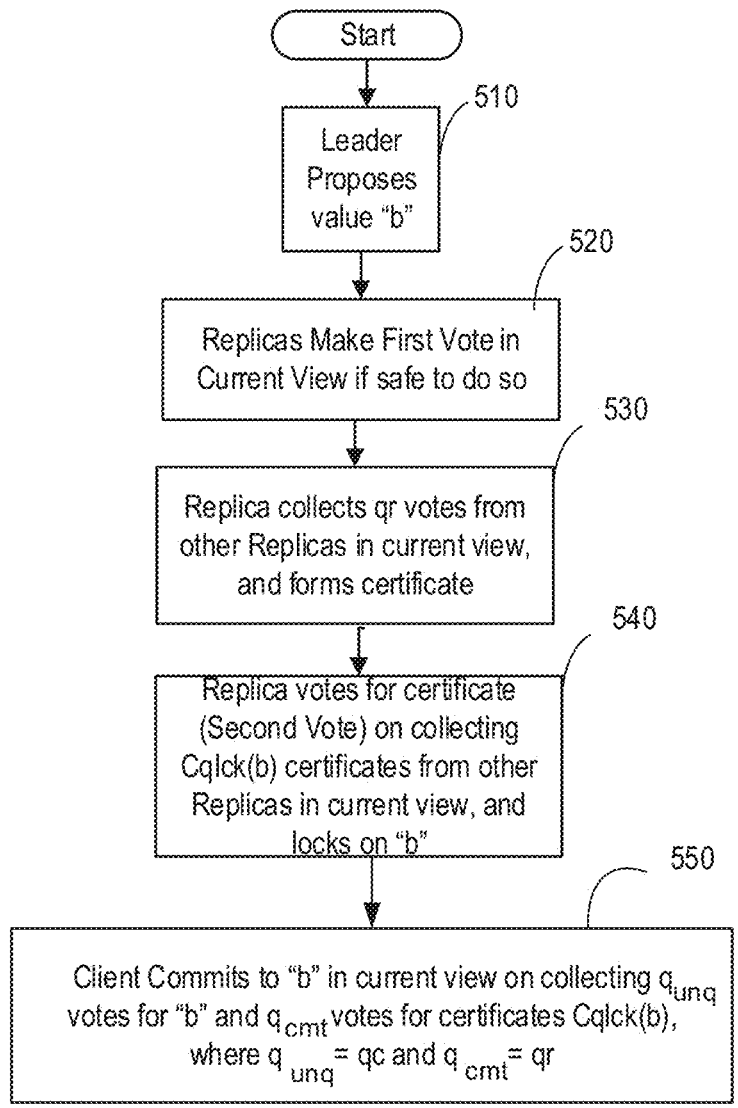
FIG. 5 is a flow diagram of a Flexible BFT protocol that may operate with the set of replicas shown in FIG. 4 by using different quorum sizes, according to one or more embodiments.

FIG. 5 is a flow diagram of a Flexible BFT protocol that may operate with the set of replicas shown in FIG. 4, according to one or more embodiments. The Flexible BFT protocol separates the quorums used in BFT protocols for the replicas (acceptors) from the quorums used for learning when a decision becomes committed. More specifically, the quorum used for forming certificates (locking) is denoted by $q_{lck}$ and the quorum used for unlocking is denoted by $q_{ulck}$. The quorum employed by clients for learning certificate uniqueness is denoted by $q_{unq}$, and the quorum used for learning commit safety is denoted by $q_{cmt}$. In other words, clients mandate $q_{unq}$ first-round votes and $q_{cmt}$ second-round votes in a view in order to commit a decision. In essence, Flexible BFT operates as a modified PBFT-like protocol that uses different quorum sizes, referred to as flexible byzantine quorums, instead of a single quorum size q, to provide both safety and liveness.

A leader of the replicas proposes a value b in step 510. The leader may be elected in each view on a round robin basis, by way of example, whereby the leader changes for each succeeding view. The replicas in the group of replicas make a first vote on the proposed value b in step 520. In more detail, on receiving the first value b for a view v, a replica votes for b if it is safe to do so, as determined by a locking mechanism described below. A replica collects a set of $q_{lck}$ votes in step 530, and forms a certificate $C^{qlck}$ (b) in the view.

A replica "locks" on vote b and votes for $C^{qlck}$ (b) in step 540 on collecting $C^{qlck}$ (b) certificates from the other replicas in the view.

A client learns, in step 550, that proposal b becomes a committed decision on collecting $q_{unq}$ votes for b and $q_{cmt}$ votes for $C^{qlck}$ (b) in the view, and thereby commits to the proposal b.

Note that, if a replica locks on a value b in a view, then that replica votes only for b in subsequent views unless the replica "unlocks" from b by learning that $q_{ulck}$ replicas are not locked on b in a subsequent view.

By way of the Flexible BFT protocol as shown in FIG. 5 having two separate quorums, one for the replicas to vote and one for the client to commit, the protocol can be disengaged from the client requirements, and thereby allow for different types of clients with different criteria to operate in the same replicated service with the same Flexible BFT protocol.

Other advantages due to the use of flexible quorums, one for the replicas and one for the client or clients, in Flexible BFT are delineated below.

Flexible quorum intersection within a view. In contrast to PBFT, in Flexible BFT, a pair of $q_{lck}$ certificates need not necessarily intersect in an honest replica. This is due to locking on a value not precluding conflicting locks. Flexible BFT only mandates that every $q_{lck}$ quorum intersects with every $q_{unq}$ quorum at at least one honest replica. Thus, for safety in Flexible BFT, the fraction of faulty replicas is less than $q_{lck}+q_{unq}-1$.

Flexible quorum intersection across views. If a client commits to a value b in a view, $q_{cmt}$ replicas lock on b in that view. For an honest replica among them to unlock from b, $q_{ulck}$ replicas need to claim they are not locked on b. This property mandates that every $q_{ulck}$ quorum intersects with every $q_{cmt}$ quorum at at least one honest replica. Thus, for safety, the fraction of faulty replicas is less than $q_{ulck}+q_{cmt}-1$.

Flexible quorum availability within each view. For liveness, Byzantine replicas cannot exceed $1-\max(q_{unq}, q_{cmt}, q_{lck}, q_{ulck})$, so that the aforementioned quorums can be formed at different stages of the Flexible BFT protocol.

Given the above analysis, Flexible BFT ensures safety if the fraction of faulty replicas is less than $\min(q_{unq}+q_{lck}-1, q_{cmt}+q_{ulck}-1)$, and provides liveness if the fraction of Byzantine replicas is at most $1-\max(q_{unq}, q_{cmt}, q_{lck}, q_{ulck})$. One may optimally use balanced quorum sizes where $q_{lck}=q_{ulck}$ and $q_{unq}=q_{cmt}$. To obtain this optimal quorum size, first note that $q_{unq}+q_{lck}=q_{cmt}+q_{ulck}$; otherwise, suppose the right-hand side is smaller, then setting ($q_{cmt}, q_{ulck}$) to equal ($q_{unq}, q_{lck}$) improves safety tolerance without affecting liveness tolerance. Next, note that if $q_{unq}+q_{lck}=q_{cmt}+q_{ulck}$ but $q_{lck}>q_{ulck}$ (and hence $q_{unq}<q_{cmt}$), then once again setting ($q_{cmt}, q_{ulck}$) to equal ($q_{unq}, q_{lck}$) improves safety tolerance without affecting liveness tolerance.

Thus, for Flexible BFT, $q_{lck}=q_r$ and $q_{unq}=q_{cmt}$. Since replicas use $q_r$ votes to lock, these votes can always be used by the clients to commit $q_{cmt}$ quorums. Thus, $q_c \geq q_r$. The Flexible Byzantine Quorum requirements thereby collapse into the following two conditions.

Flexible quorum intersection. The fraction of faulty replicas is $<q_c+q_r-1$.

Flexible quorum availability. The fraction of Byzantine replicas is $\leq 1-q_c$.

Tolerating alive-but-corrupt faults. If all faults in the system are Byzantine faults, then the best parameter choice is $q_c \geq 2/3$ for $<1/3$ fault tolerance, and Flexible Byzantine Quorums degenerates to basic Byzantine quorums. However, alive-but-corrupt replicas are only interested in attacking safety but not liveness. This allows Flexible BFT to tolerate $q_c+q_r-1$ total faults (Byzantine plus alive-but-corrupt faults), which can be more than ⅓. For example, if $q_r=0.7$ and $q_c=0.8$, then such a protocol can tolerate 0.2 Byzantine faults plus 0.3 alive-but-corrupt faults.

Separating client commit rules from the replica protocol. One property of the Flexible BFT and its use of Flexible Byzantine Quorums is that it decouples the BFT protocol from client commit rules. The decoupling allows clients assuming different fault models to utilize the same (Flexible BFT) protocol. In Flexible BFT, the propose and two voting steps are executed by the replicas and they are only parameterized by $q_r$. The commit step can be carried by different clients using different commit thresholds $q_c$. Thus, a fixed $q_r$ determines a possible set of clients with varying commit rules (in terms of Byzantine and alive-but-corrupt adversaries). A Byzantine adversary can behave arbitrarily and thus may not provide liveness whereas an alive-but-corrupt adversary only intends to attack safety but not liveness. Thus, a client who believes that a large fraction of the adversary may attempt to break safety, not progress, can choose a larger $q_c$. By doing so, it seeks stronger safety against dishonest replicas, while trading liveness. Conversely, a client that assumes that a large fraction of the adversary attacks liveness must choose a smaller $q_c$. As such, the Flexible BFT protocol according to one or more embodiments supports heterogeneous clients having different criteria regarding network characteristics and different criteria regarding transaction approval parameters.

Figure 6:
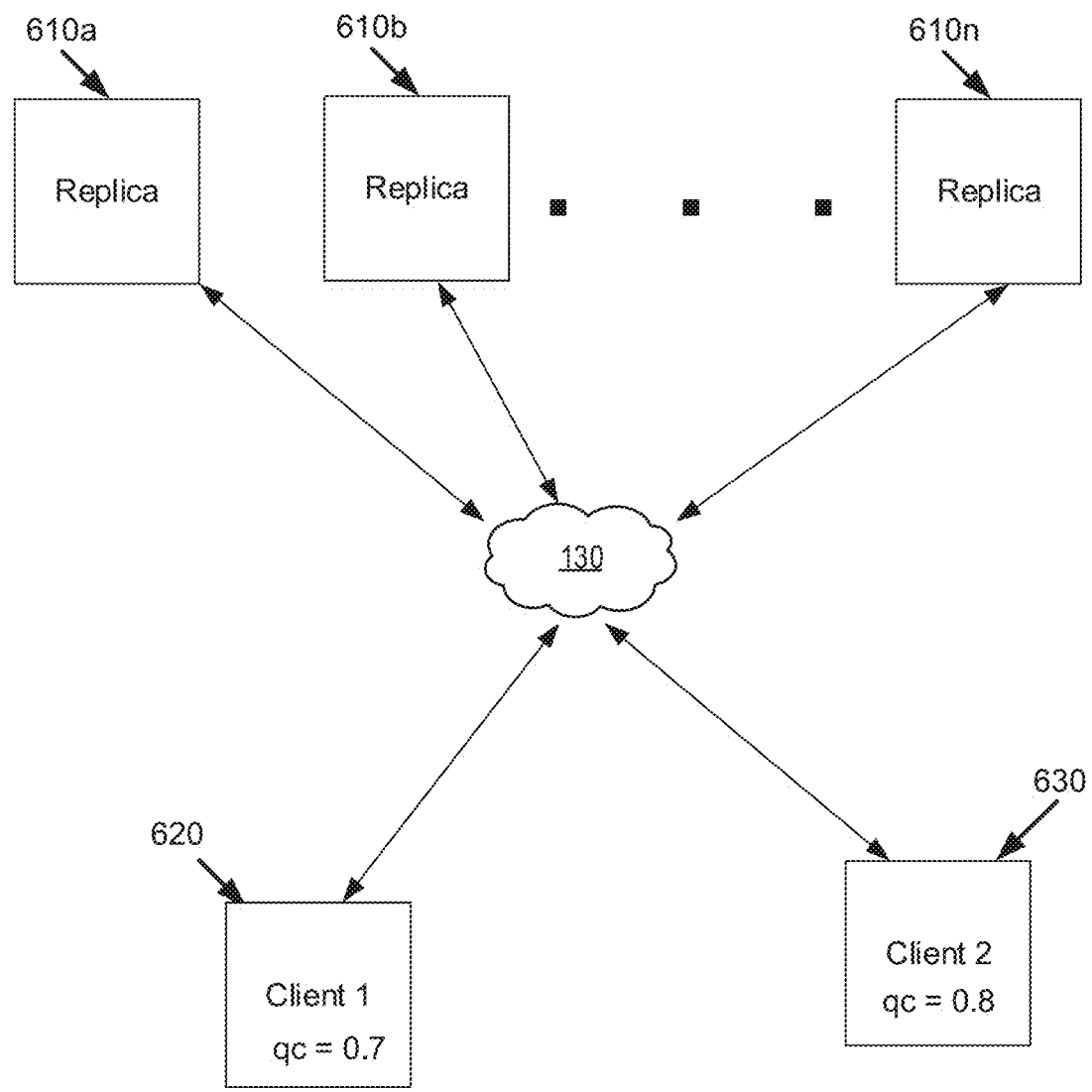
FIG. 6 is a diagram shown two different clients operating in a replicated service using Flexible BFT protocol in which each client has its own fault criteria and synchrony/partial synchrony network criteria, according to one or more embodiments.

FIG. 6 is a diagram shown two different clients operating in a replicated service comprising Replicas 610a, 610b, 610n, using Flexible BFT protocol in which each client has its own fault criteria, according to one or more embodiments. Client #1 620 chooses qc=0.7, whereas client #2 630 chooses qc=0.8, whereas qr is chosen by the administrator to be 0.7. Based on the Flexible BFT equations provided above, for client #1 620, the fraction of Byzantine replicas that the replicated service can handle ≤1−0.7=0.3, and the fraction of faulty replicas <0.7+0.7−1=0.4, thereby resulting in the replicated service capable of handling 0.3 Byzantine replicas and 0.1 alive-but-corrupt replicas. That is, for 10 replicas, the replicated service is capable of handling 0.3*10=3 Byzantine replicas and 0.1*10=1 alive-but-corrupt replica in the group of 10 replicas in a view while still guaranteeing an uncorrupted vote by the replicas in the view.

For client #2 630, the fraction of Byzantine replicas that the replicated service can handle ≤1−0.8=0.2, and the fraction of faulty replicas <0.8+0.7−1=0.5, thereby resulting in the replicated service capable of handling 0.2 Byzantine replicas and 0.3 alive-but-corrupt replicas. That is, for 10 replicas, the replicated service is capable of handling 0.2*10=2 Byzantine replicas and 0.3*10=3 alive-but-corrupt replicas in a view while still guaranteeing an uncorrupted vote by the replicas in the view.

One useful property of the Flexible BFT is that it decouples the BFT protocol from client commit rules. The decoupling allows clients assuming different fault models to utilize the same protocol. In Flexible BFT with different quorum sizes for the replicas and for the client, the propose and two voting steps are executed by the replicas and they are only parameterized by $q_r$. The commit step may be carried by different clients using different commit thresholds $q_c$. Thus, a fixed $q_r$ determines a possible set of clients with varying commit rules (in terms of Byzantine and alive-but-corrupt adversaries). As stated earlier, a Byzantine adversary can behave arbitrarily and thus may not provide liveness, whereas an alive-but-corrupt adversary only intends to attack safety but not liveness. Thus, a client who believes that a large fraction of the adversary may attempt to break safety, not progress, can choose a larger $q_c$. By doing so, it seeks stronger safety against dishonest replicas, while trading liveness. Conversely, a client that assumes that a large fraction of the adversary attacks liveness should choose a smaller $q_c$.

Figure 7:
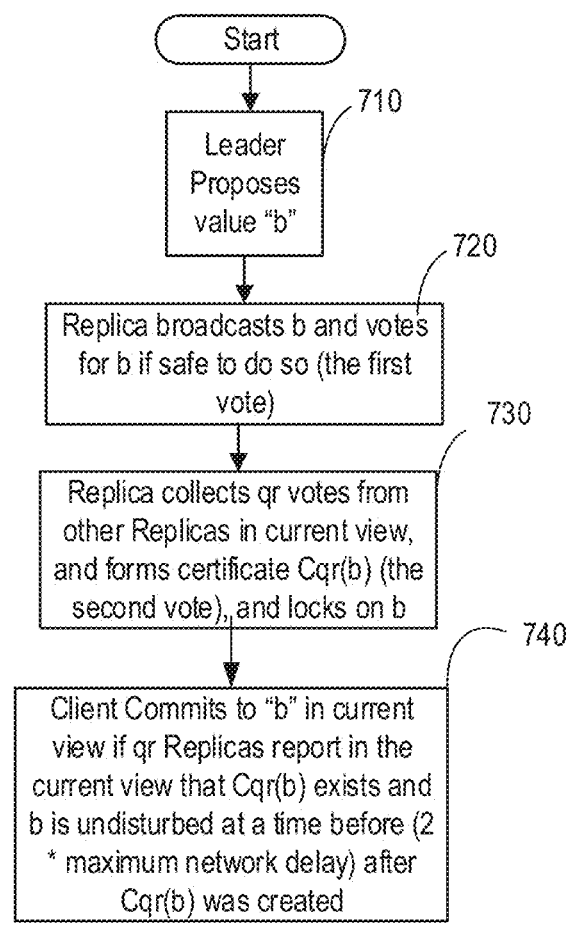
FIG. 7 is a flow diagram of a Flexible BFT protocol that may operate with the set of replicas shown in FIG. 4 by using a maximum network delay value for use by a client in a commit decision, according to one or more embodiments.

FIG. 7 is a flow diagram of a Flexible BFT protocol that may operate with the set of replicas, such as the replicas shown in FIG. 4 for example, by using a maximum network delay for use by a client in a commit decision, according to one or more embodiments. The Flexible BFT protocol based on maximum network delay value operates at the network speed for the replicas in a view, such that the replicas run a partially synchronous protocol and do not rely on synchrony at any point. Clients, on the other hand, rely on synchrony bounds to commit. This separation is what allows the Flexible BFT protocol to support clients with different assumptions on the maximum network delay Δ (i.e., the maximum expected network delay, which corresponds to the maximum amount of time it takes for one replica to send a vote to another replica via a network connection in a view). In addition, the Flexible BFT protocol tolerates a combined Byzantine plus alive-but-corrupt fault ratio greater than a half (Byzantine fault tolerance is still less than half), which is an improvement over conventional BFT protocols.

For ease in explanation, the Flexible BFT protocol that uses maximum network delay Δ for a client commit decision is described hereinbelow with respect to a single shot consensus, whereby this may be generalized for achieving a consensus on a sequence of values such as a block-chain implementation.

The Flexible BFT protocol that uses maximum network delay Δ for a client commit decision is described with respect to FIG. 7, in which it runs in a sequence of views. Each view has a designated leader who may be selected in a round robin order or in some other a priori manner. The leader drives consensus in that view. In each view, the protocol runs in two steps—propose and vote. In the propose step, the leader proposes a value b. In the vote step, replicas vote for the value if it is safe to do so. The vote also acts as a re-proposal of the value. If a replica observes a set of $q_r$ votes on b, called a certificate $C^{q_r}$ (b), it "locks" on b. The set of votes $q_r \geq ½$ is required to be received by a replica in order for that replica to obtain a certificate. In subsequent views, a replica will not vote for a value other than b unless it learns that $q_r$ replicas are not locked on b. In addition, the replicas switch views (i.e., changes the leader) if they either observe an equivocation or if they do not receive a proposal from the leader within some timeout. A client commits to b if $q_r$ replicas state that there exists a view in which b is certified and no equivocating value or view change was observed at a time before 2Δ after it was certified. Again, Δ represents is the maximum expected network delay.

The protocol ensures safety if there are fewer than $q_r$ faulty replicas. The proof for safety in Flexible BFT is based on the following: If an honest replica h satisfies the commit condition for some value b in a view, then (a) no other value can be certified and (b) all honest replicas are locked on b at the end of that view. To elaborate, satisfying the commit condition implies that some honest replica h has observed an undisturbed 2Δ period after it locked on b, i.e., it did not observe an equivocation or a view change. Suppose the condition is satisfied at time t. This implies that other replicas did not observe an equivocation or a view change before t−Δ. The two properties above hold if the quorum honesty conditions below hold. For liveness, if Byzantine leaders equivocate or do not propose a safe value, they will be blamed and a view change will ensue. Eventually there will be an honest leader to drive consensus if quorum availability holds.

The following advantages of Flexible BFT based on use of network delay Δ for a client commit decision is detailed below.

Quorum honesty within a view. Since the undisturbed period starts after b is certified, h must have voted (and re-proposed) b at a time earlier than t−2Δ. Every honest replica must have received b before t−Δ. Since they had not voted for an equivocating value by then, they must have voted for b. Since the number of faults is less than $q_r$, every certificate needs to contain an honest replica's vote. Thus, no certificate for any other value can be formed in this view.

Quorum honesty across views. Honest replica h sends $C^{qr}$ (b) at time t−2Δ. All honest replicas in the group of replicas receive $C^{qr}$ (b) by time t −Δ and become locked on b. For an honest replica to unlock from b in subsequent views, $q_r$ replicas need to claim that they are not locked on b. At least one of them is honest and would need to falsely claim it is not locked, which cannot happen.

With reference now to FIG. 7, which shows a method of Flexible BFT using maximum network delay Δ for a client commit decision, the leader L of view proposes a value b (i.e., vote "Yes") in step 710.

A replica broadcasts b and votes for b if it is safe to do so, in step 720, on receiving the first value b in a view v, as determined by a locking mechanism described below. If the replica collects $q_r$ votes on b, denoted as certificate $C^{qr}$ (b) of b from view v, then it "locks" on b in step 730 and records the lock time as t-lock$_v$.

If the replica observes an equivocating value signed by L at any time after entering view v, it records the time of equivocation as t-equiv$_v$. The replica then blames the leader by broadcasting (blame, v), and the equivocating values. If the replica does not receive a proposal for sufficient time in view v, it times out and broadcasts (blame, v). If the replica collects a set of $q_r$ (blame, v) messages in a view, it records the time as t-viewchange$_v$, broadcasts the set of blame messages, and enters view v+1.

If a replica locks on a value b in a view, then it votes only for b in subsequent views unless it "unlocks" from b by learning that $q_r$ replicas are not locked on b in that view or higher (they may be locked on other values or they may not be locked at all).

A client commits to a value b in a view in step 740 if $q_r$ replicas report that there exists a view v such that:
1. b is certified, i.e., $C_v^{qr}$ (b) exists.
2. b is undisturbed, i.e., no equivocating value or view change was observed at a time before 2Δ after it was certified, or more formally, min(current-time, t-equiv$_v$, t-viewchange$_v$)−t-lock$_v$≥2Δ.

The above-described Flexible BFT using maximum network delay Δ for a client commit decision has the following capabilities:

Quorum availability. Byzantine replicas do not exceed 1−$q_r$, so that $q_r$ replicas respond to the leader.

Tolerating alive-but-corrupt faults. If there are only honest and Byzantine replicas (and no alive-but-corrupt replicas) in a set of replicas, quorum honesty requires the fraction of Byzantine replicas B<$q_r$. Quorum availability requires B≤1−$q_r$. If optimization is performed for maximizing B, then the following equation is obtained: $q_r$≥½. Now, if P represents the fraction of alive-but-corrupt replicas, quorum honesty requires B+P<$q_r$, and quorum availability requires B≤1−$q_r$. Thus, the protocol supports varying values of B and P at different values of $q_r$≥½ such that safety and liveness are both preserved.

Separating client synchrony assumption from the replica protocol. Another aspect of Flexible BFT using network delay Δ for a client commit decision is the separation of the client commit rule from the protocol design. In particular, although this is a synchronous protocol, the replica protocol does not rely on any synchrony bound. This allows clients to choose their own message delay bounds. Thus, any client that uses a correct message delay bound enjoys safety.

Figure 8:
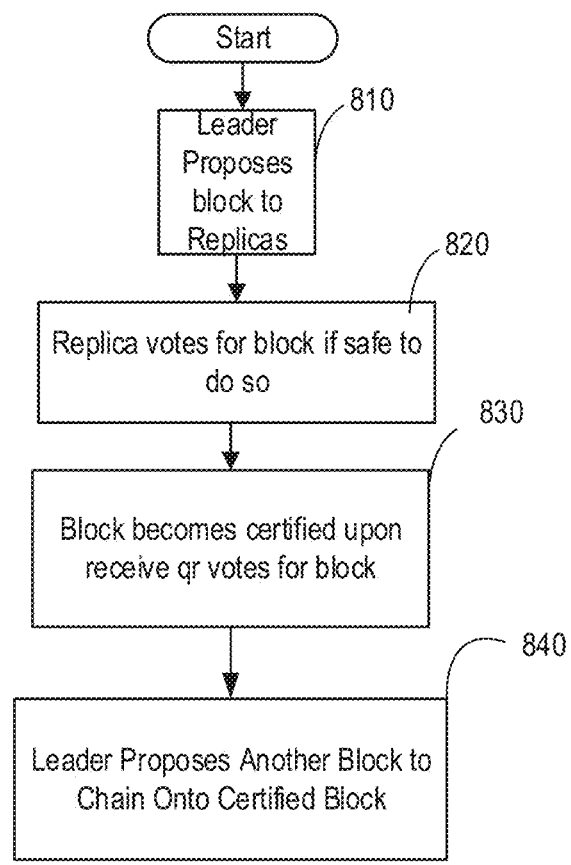
FIG. 8 is a flow diagram of a Flexible BFT protocol applied to a block chain, according to one or more embodiments.

FIG. 8 is a flow diagram of a Flexible BFT protocol applied to a block chain transaction, according to one or more embodiments. In more detail, the Flexible BFT protocol applied to a block chain transaction includes the features of client commit based on a different quorum size as used by replicas according to one or more embodiments described above, together with a client commit decision based on use of maximum network delay (or maximum message delay) Δ between replicas according to one or more other embodiments described above, to achieve a combined Flexible BFT protocol that supports all types of clients. That is, a client can either assume partial synchrony, with freedom to choose $q_c$ as described in the previous section, or assume synchrony with its own choice of Δ, as described above with respect to some embodiments in which Replicas execute a protocol at the network speed with a parameter $q_r$ according to other embodiments.

For better understanding of the Flexible BFT protocol applied to a block chain transaction, some data structures and terminologies of the Flexible BFT protocol are defined below. In block chain terminology, a block chain contains all of the transactions completed since the beginning of a particular ledger. The block chain may be considered as a ledger book, in which each block is a page in the ledger and each transaction is an individual asset transfer on a ledger page. In that sense, a block chain corresponds to a digitized, decentralized public ledger of all transactions, such as all cryptocurrency transactions. Each node in the block chain network maintains its own local ledger, in which transactions are added to the set of transactions in the local ledger maintained by the node. That way, each time a new transaction gets added, all of the copies of the local ledger get updated to reflect the new transaction. With reference to FIG. 1, the local ledger for a replica corresponding to computer system 100 may be stored in system memory 122 and/or in storage device 127.

Block format. The pipelined protocol forms a chain of values. The term block refers to each value in the chain. A block's position in the chain is referred to as its height. A block $B_k$ at height k has the following format: $B_k:=(b_k, h_{k−1})$, where $b_k$ denotes a proposed value at height k and $h_{k−1}:=H(B_{k−1})$ is a hash digest of the predecessor block. The first block $B_1=(b_1, \perp)$ has no predecessor. Every subsequent block $B_k$ must specify a predecessor block $B_{k−1}$ by including a hash of it. If $B_k$ is an ancestor (not necessarily a proper ancestor) of $B_l$ (l≥k), we say $B_l$ extends $B_k$. A block is valid if (i) its predecessor is valid or ⊥, and (ii) its proposed value meets application-level validity conditions and is consistent with its chain of ancestors (e.g., does not double spend a transaction in one of its ancestor blocks), replicas in view v. In the Flexible BFT protocol applied to a block chain transaction, replicas vote for blocks by signing them. $C^{qr}(B_k)$ denotes a set of signatures on $h_k=H(B_k)$ by $q_r$ replicas in view v, where $q_r$ is a parameter fixed for the protocol instance. $C^{qr}(B_k)$ is referred to as a certificate for $B_k$ from view v. Certified blocks are ranked first by the views in which they are certified and then by their heights. In other words, a block $B_k$ certified in view v is ranked higher than a block $B_{k'}$ certified in view $v'$ if either (i) $v>v'$ or (ii) $v=v'$ and $k>k'$.

At any time, a replica locks the highest certified block to its knowledge. During the Flexible BFT protocol applied to block chain transaction execution, each replica keeps track of all signatures for all blocks and keeps updating its locked block. The notion of locked block is used in Flexible BFT protocol applied to a block chain transaction to guard the safety of a client commit.

Turning now to FIG. 8, the replica protocol progresses in a view-by-view manner. Each view has a designated leader who is responsible for driving consensus on a sequence of blocks. As discussed previously, leaders can be chosen statically, e.g., round robin, or randomly using more sophisticated techniques (e.g., the replica who was not made a leader for the longest amount of time as compared to the other replicas becomes the next leader). In FIG. 8, around robin selection of leaders is assumed, i.e., (v mod n) is the leader of view v.

Figure 9:
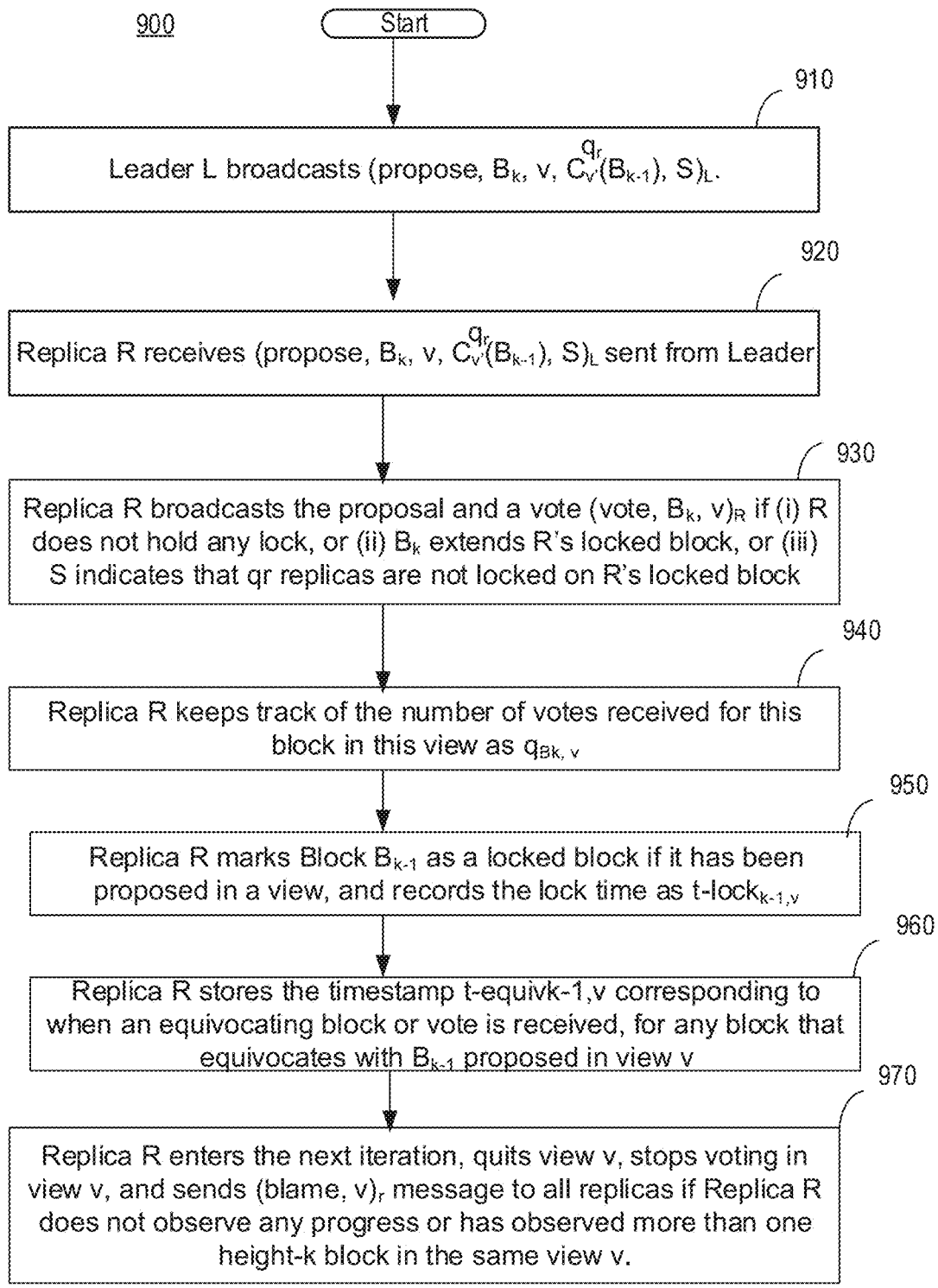
FIG. 9 is a flow diagram showing the steady state and view change protocols for Flexible BFT applied to block chain, according to one or more embodiments.

At a high level, the Flexible BFT protocol applied to block chain transaction does the following. The leader proposes a block to all replicas, as shown in step 810. The replicas vote on it if safe to do so, as shown in step 820. The block becomes certified once $q_r$ replicas vote on it, as provided in step 830. The leader will then propose another block extending the previous one, chaining blocks one after another at increasing heights, as shown in step 840. Unlike BFT conventional consensus protocols where replicas determine when a block is committed, in Flexible BFT for block chain implementations, replicas only certify blocks and committing is offloaded to the clients. If at any time replicas detect malicious leader behavior or lack of progress in a view, they blame the leader and engage in a view change protocol to replace the leader and move to the next view. The new leader collects a status from different replicas and continues to propose blocks based on this status. The steady state and view change protocols are detailed below, with reference to the method 900 shown in FIG. 9.

For the discussion herein, let v designate the current view number, and replica L designate the leader in the view. Leader L broadcasts, in step 910, a proposed vote, corresponding to message (propose, $B_k$, v, $C_{v'}^{qr}(B_{k-1})$, S)$_L$. Here, Bk=(bk, hk−1) is the newly proposed block and it should extend the highest certified block known to Leader L. In the steady state, an honest leader L would extend the previous block it proposed, in which case $v'=v$ and $S=\perp$. Immediately after a view change, Leader L determines the highest certified block from the status S received during the view change.

Each replica R receives, in step 920, the message (propose, $B_k$, v, $C_{v'}^{qr}(B_{k-1})$, S)$_L$ output by Leader L.

Each replica R broadcasts, in step 930, the proposal and a vote, (vote, $B_{k, v})_R$ if: i) R does not hold any lock, or ii) $B_k$ extends R's locked block, or iii) S indicates that $q_r$ replicas are not locked on R's locked block.

Each replica R keeps track of, in step 940, the number of votes received for this block $B_k$ in this view v, as $q_{Bk, v}$.

Each replica R marks, in step 950, Block $B_{k-1}$ as a locked block if it has been proposed in a view v, and the replica R records the lock time as t-lock$_{k-1, v}$.

Each replica R stores, in step 960, for any block that equivocates with $B_{k-1}$ proposed in view v, the timestamp tequiv$_{k-1, v}$ corresponding to the time when an equivocating block or vote is received.

Each replica R enters the next iteration in step 970, and if replica R does not observe any progress or has observed more than one height-k block in the same view v, i) quits view v, ii) stops voting in view v, and iii) sends (blame, v)$_r$ message to all other replicas.

In the steady state, there is a unique leader L who, in an iteration, proposes a block, waits for votes from $q_r$ replicas and moves to the next iteration. In the steady state, an honest leader always extends the previous block it proposed. However, immediately after a view change, since the previous leaders could have been a Byzantine replica and may have proposed multiple conflicting blocks, the new leader needs to determine a safe block to propose. It does so by collecting a status of locked blocks from $q_r$ replicas denoted by S.

For a replica R in the steady state, on receiving a proposal for block $B_k$, a replica votes for it if (i) R does not hold any lock, or (ii) $B_k$ extends R's locked block, or (iii) the status indicates that $q_r$ replicas are not locked on to R's locked block. Replica R can potentially receive blocks out of order and thus receive $B_k$ before its ancestor blocks. In this case, replica R waits until it receives the ancestor blocks, verifies the validity of those blocks and $B_k$ before voting for $B_k$. In addition, replica R records the following to aid a client commit.

A replica records the number of votes received for $B_k$ in view v as $q_{B_k, v}$. In Flexible BFT applied to block chain transaction, votes are broadcast by all replicas and the number of votes for a block can be greater than $q_r$. The number of votes received, $q_{B_k, v}$, is updated each time that the replica learns about a new vote in view v.

If $B_{k-1}$ was proposed in the same view v, it locks $B_{k-1}$ and records the locked time as t-lock$_{k-1, v}$.

If the replica ever observes an equivocating block at height k in view v through a proposal or vote, it stores the time of equivocation as t-equiv$_{k, v}$.

The locked time t-lock$_{k-1, v}$ and equivocation time t-equiv$_{k-1, v}$ will be used by clients with synchrony assumptions to commit, and the number of votes $q_{B_k, v}$ will be used by clients with partial-synchrony assumptions to commit.

If a replica detects a lack of progress in view v or observes malicious leader behavior such as more than one height-k blocks in the same view, it blames the leader of view v by broadcasting a (blame, v) message. The replica quits view v and stops voting and broadcasting blocks in view v. To determine lack of progress, the replicas may simply guess a time bound for message arrival or use increasing timeouts for each view.

The view change protocol is described below. If a replica gathers $q_r$ blame messages from distinct replicas, it forwards them to all other replicas and enters a new view v+1.

(Step (i)). The replica records the time at which it received the blame certificate as t-viewchange$_v$. Upon entering a new view, a replica reports to the leader of the new view $L^j$ its locked block and transitions to the steady state (Step (ii)). $q_r$ status messages form the status S. The first block $L^j$ proposes in the new view extends the highest certified block among these $q_r$ status messages.

The client commit rules applicable to Flexible BFT for block chain transaction application are provided below, according to one or more embodiments.

Client Commit Rules

Partially-synchronous commit (CR1). A block $B_k$ is committed under the partially synchronous rule with parameter qc iff there exists $1 \geq k$ and v such that (a) $C_v^{qr}(B)$ and $C_v^{qr}(B_l+1)$ exist where $B_{l+1}$ extends $B_l$ and $B_k$ (if $1=k$, $B_l=B_k$).

(b) $q_{Bl}, v \geq q_c$ and $q_{Bl}+1, v \geq q_c$.

Synchronous commit (CR2). A block bk is committed assuming Δ-synchrony iff the following holds for $q_r$ replicas. There exist l≥k and v (possibly different across replicas) such that, (a) $C_{v,}^{qr}(B_1)$ exists where $B_l$ extends $B_k$ (if l=k, $B_l$=$B_k$).

(b) An undisturbed 2Δ period is observed after $B_{l+1}$ is obtained, i.e., no equivocating blocks or votes at height 1 or view v were observed before 2Δ time after $B_{l+1}$ was obtained, i.e., $$\min(\text{current-time}, t\text{-equiv}_{l,v}, t\text{-viewchange}_v) - t\text{-lock}_{l,v} \geq 2\Delta$$

Flexible BFT according to the embodiments described above supports clients with different network and fault assumptions. Clients in Flexible BFT can learn the state of the protocol from the replicas, and, based on their own assumptions, determine whether a block has been committed. Flexible BFT supports two types of clients: those who believe in synchrony and those who believe in partial synchrony.

A client with partial-synchrony assumptions deduces whether a block has been committed based on the number of votes received by a block. A block $B_l$ (together with its ancestors) is committed with parameter $q_c$ if and only if (iff) $B_l$ and its immediate successor both receive ≥$q_c$ votes in the same view.

A commit by a client of a block $B_l$ with partial-synchrony assumptions based on $q_c$ votes is safe against <$q_c$+$q_r$−1 faulty replicas (Byzantine plus alive-but-corrupt). Note that if $B_l$ gets $q_c$ votes in view v, due to flexible quorum intersection, a conflicting block cannot be certified in view v, unless ≥$q_c$+$q_r$−1 replicas are faulty. Moreover, $B_{l+1}$ extending $B_l$ has also received $q_c$ votes in view v. Thus, $q_c$ replicas lock block $B_l$ in view v. In subsequent views, honest replicas that have locked on $B_l$ will only vote for a block that extends $B_l$ unless they unlock. However, due to flexible quorum intersection, they will not unlock unless $q_c$+$q_r$1 replicas are faulty.

A commit by a client of a block Bk with Synchrony Assumptions involves $q_r$ replicas collectively stating that a block $B_l$ extending $B_k$ encounters no "bad event" within "sufficient time" in a view. Here, a bad event refers to either leader equivocation or view change (the latter indicates sufficient replicas believe leader is faulty) and the "sufficient time" is 2Δ, where Δ is a synchrony bound chosen by the client. More formally, a replica states that a synchronous commit for block $B_k$ for a given parameter Δ (set by a client) is satisfied iff the following holds. There exists $B_{l+1}$ that extends $B_l$ and $B_k$, and the replica observes an undisturbed-2Δ period after obtaining $B_{l+1}$, i.e., within 2Δ time after $B_{l+1}$ was obtained, (i) no equivocating block is observed at height 1, and (ii) no blame certificate/view change certificate for view v was obtained, i.e., min(current-time, t-equiv$_{l,v}$, t-viewchange$_v$)−t-lock$_{l,v}$≥2 Δ where t-equiv$_{l,v}$ denotes the time equivocation for $B_l$ in view v was observed (∞ if no equivocation), t-viewchange$_v$ denotes the time at which view change happened from view v to v+1 (if no view change has happened yet), and t-lock$_{l,v}$ denotes the time at which $B_l$ was locked (or $B_{l+1}$ was proposed) in view v. Note that the client does not require the $q_r$ fraction of replicas to report the same height 1 or view v. A client believing in synchrony assumes that all messages between replicas arrive within Δ time after they were sent. If the client's chosen Δ is a correct upper bound on message delay, then a full synchrony commit is safe against $q_r$ faulty replicas (Byzantine plus alive-but-corrupt), as explained below. If less than $q_r$ replicas are faulty, at least one honest replica h reported an undisturbed-2Δ period. From h's perspective, an undisturbed 2Δ period ensures safety. Observe that replicas in Flexible BFT forward the proposal when voting. If Δ-synchrony holds, every other honest replica learns about the proposal $B_l$ at most Δ time after h learns about it. If any honest replica voted for a conflicting block or quit view v, h would have known within 2Δ time.

Based on the above descriptions, a block is committed directly under the partial synchrony assumption if the block and its immediate successor both get $q_c$ votes in the same view. A block is committed directly under the full synchrony assumption if some honest replica reports an undisturbed-2Δ period after its successor block was obtained. A block is committed indirectly if neither condition applies to it but it is committed as a result of a block extending it being committed directly.

As described above, three parameters $q_r$, $q_c$, and Δ may be used to determine the Flexible BFT protocol according to one or more embodiments. The parameter $q_r$ is the only parameter for the replicas and is picked by the service administrator. The choice of $q_r$ determines a set of client assumptions that can be supported. $q_c$ and Δ are chosen by clients to commit blocks. Client fault assumptions that may be supported by a given $q_r$, and the trade-offs between different choices of $q_r$ with respect to one or more embodiments are described below.

Figure 10:
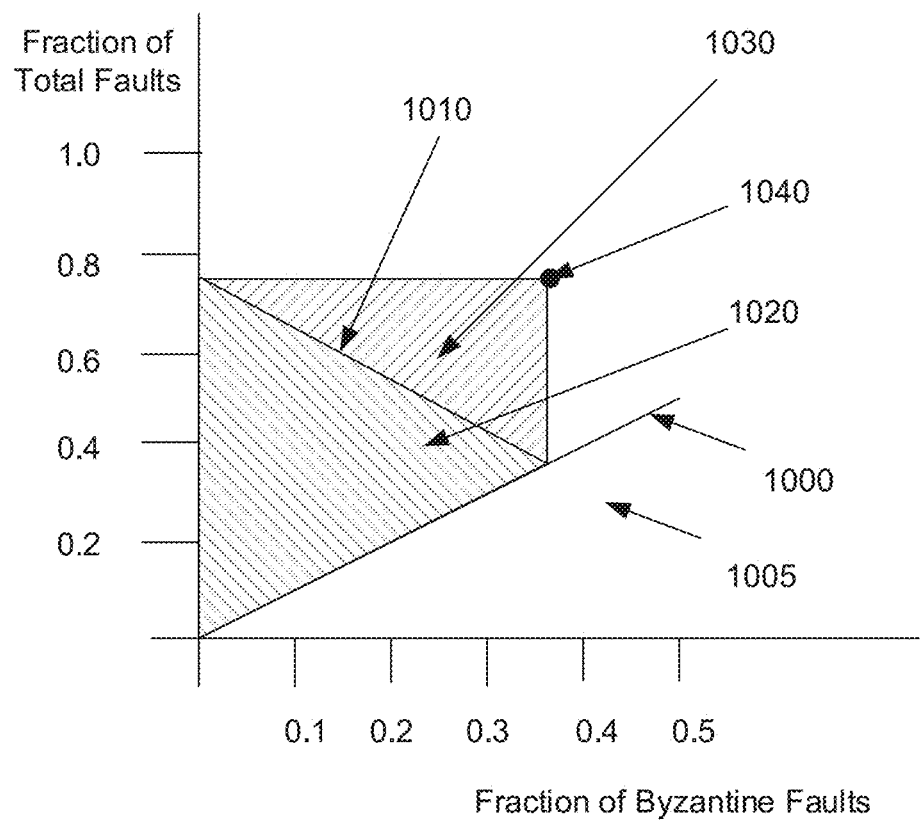
FIG. 10 is a graph showing the fault tolerant capabilities of Flexible BFT with respect to fraction of total faults/ fraction of Byzantine faults with clients supported at $q_r=2/3$, according to one or more embodiments.

FIG. 10 is a graph showing clients supported at $q_r$=⅔, where the x-axis represents Byzantine faults and the y-axis represents total faults (Byzantine plus alive-but-corrupt). Each point on the graph represents a client fault assumption as a pair: (Byzantine faults, total faults). The area 1005 beneath line 1000 indicates an "invalid area" since there cannot be fewer total faults than Byzantine replicas. A missing dimension in FIG. 10 is the choice of upper message delay bound Δ. Thus, the synchrony guarantee shown in this figure is for clients that choose a correct upper message delay bound. Clients with partial-synchrony assumptions can get fault tolerance on (or below) line 1010 (shown as a hatched area 1020 in FIG. 10). The right most point on the line 1010 is (⅓, ⅓), i.e., it tolerates less than a third of Byzantine replicas and no additional alive-but-corrupt replicas. This is the setting of existing partially synchronous consensus protocols. Flexible BFT generalizes these protocols by giving clients the option of moving up-left along the line, i.e., tolerating fewer Byzantine and more total faults. By choosing $q_c$>$q_r$, a client tolerates <$q_c$+$q_r$−1 total faults for safety and ≤1−$q_c$ Byzantine faults for liveness. In other words, as a client moves left on line 1010, for every additional vote it requires, it tolerates one fewer Byzantine fault and one more total fault (i.e., two more alive-but-corrupt faults). The left most point on line 1010 corresponds to Byzantine Faults/Total Faults (0, ⅔), and thus that point does not tolerate any Byzantine replicas but tolerates the highest fraction (⅔ of the total replicas participating in a view) of alive-but-corrupt replicas.

Moreover, for clients who believe in synchrony, if their maximum network delay A assumption is correct, those clients enjoy ⅓ Byzantine tolerance and ⅔ total tolerance as represented by plot point 1040. This is because synchronous commit rules are not parameterized by the number of votes received.

In FIG. 10, the portion of the plot labeled as area 1020 represents fault tolerance provided by the partially synchronous commit rule described above. Specifically, setting $q_c$ to the total fault fraction yields the necessary commit rule. On the other hand, if a client's required fault tolerance lies in the portion of the plot labeled as area 1030, then the synchronous commit rule described above with an appropriate $\Delta$ picked by the client yields the necessary commit rule. Finally, if a client's target fault tolerance corresponds to the other regions of the plot above line 1000, then it is not achievable with the chosen value of $q_r$ equal to $\tfrac{2}{3}$.

If a client has made an incorrect assumption with respect to the fault threshold or synchrony parameter $\Delta$, then it can lose safety or liveness. If a client believing in synchrony picks too small a $\Delta$ and commits a value b, it is possible that a conflicting value b′ may also be certified. Replicas may choose to extend the branch containing b′, effectively reverting b and causing a safety violation. Whenever a client detects such a safety violation, it may need to revert some of its commits and increase $\Delta$ to recover.

For a client with partial-synchrony assumption, if it loses safety, it can update its fault model to move left along the line 1010, i.e., tolerate higher total faults but fewer Byzantine faults. On the other hand, if it observes no progress as its threshold $q_c$ is not met, then it moves towards the right on line 1010. However, if the true fault model is in the hatched region labeled as area 1030 in FIG. 10, then the client cannot find a partially synchronous commit rule that is both safe and live and eventually has to switch to using a synchronous commit rule.

As explained above, the goal of alive-but-corrupt replicas is to attack safety. Thus, clients with incorrect assumptions may be exploited by alive-but-corrupt replicas for their own gain (e.g., by double-spending). When a client updates to a correct assumption and recovers from unsafe commits, their subsequent commits would be safe and final. This is remotely analogous to how a Bitcoin block chain operates, in which if a client commits to a transaction when it is a few blocks deep and a powerful adversary succeeds in creating an alternative longer fork, the commit is reverted.

Figure 11:
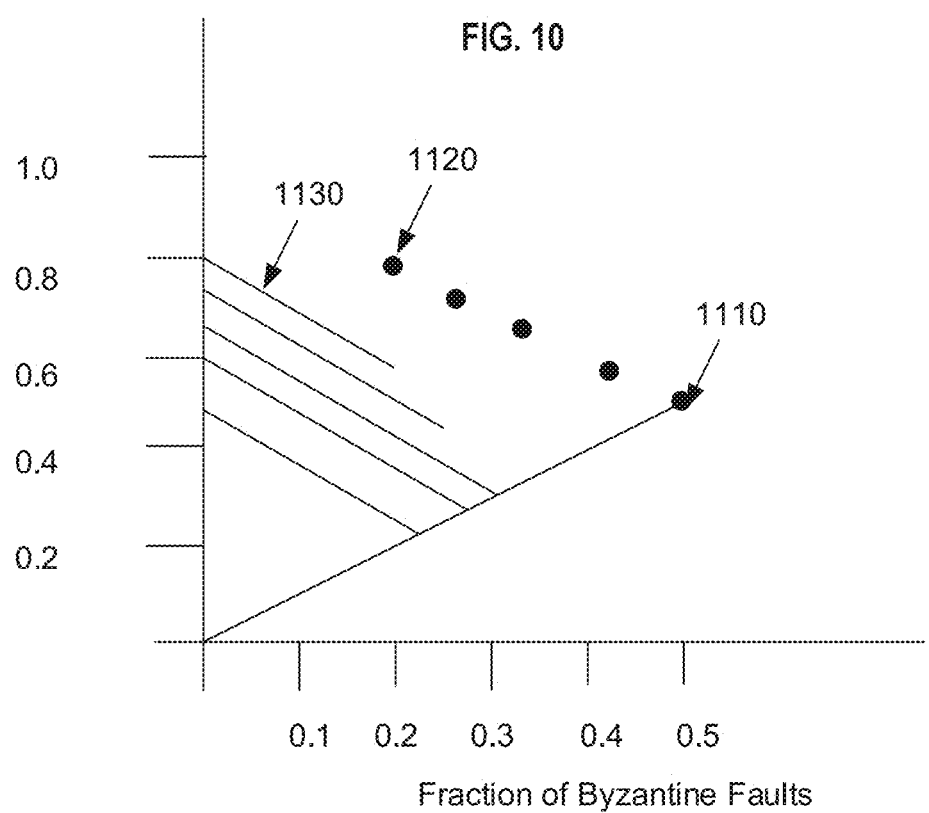
FIG. 11 is a graph showing the fault tolerant capabilities of Flexible BFT with respect to fraction of total faults/ fraction of Byzantine faults with clients supported at different values of $q_r$, according to one or more embodiments.

Similar to the choice of $q_c$ and $\Delta$ by the client as explained above, the choice of $q_r$ by the service administrator should be carefully chosen. In general, the service administrator's goal is to tolerate a large number of Byzantine and alive-but-corrupt faults, i.e., move towards top and/or right of the figure. FIG. 11 shows the trade-offs in terms of clients supported by different $q_r$ values besides $q_r = \tfrac{2}{3}$ as shown in FIG. 10 when using Flexible BFT according to one or more embodiments. Specifically, FIG. 11 shows the five respective partial-synchrony fault lines achievable for $q_r$=0.5, 0.6, 0.67, 0.75, and 0.8, and FIG. 11 also shows the five respective synchrony fault points achievable for those same $q_r$ values. Thus, for the synchrony assumption, a fraction of Byzantine faults equal to 0.5 and a fraction of total faults equal to 0.5 is achievable by using $q_r$=0.5 as shown by plot point 1110, whereas a fraction of Byzantine faults equal to 0.2 and a fraction of total faults equal to 0.8 is achievable by using $q_r$=0.8 as shown by plot point 1120. The other fault operating points for $q_r$=0.75, 0.67 and 0.6 are shown in FIG. 10 going along a downward diagonal path from the $q_r$=0.8 operating point 1120 to the $q_r$=0.5 operating point 1110. For the partial synchrony assumption, the line 1130 that runs diagonally downward from the point (0.8, 0.0) Fraction of Total Faults/Fraction of Byzantine Faults to the point (0.5, 0.2) Fraction of Total Faults/Fraction of Byzantine Faults corresponds to the achievable fault models by using $q_r$=0.8. The other fault lines that follow the same diagonal downward path for $q_r$=0.75, 0.67, 0.6, and 0.5 are shown in FIG. 11 below the $q_r$=0.8 fault line 1030.

As can be seen from FIG. 10 and FIG. 11, for clients with partial-synchrony assumptions, $q_r \geq \tfrac{2}{3}$ dominates $q_r < \tfrac{2}{3}$. Note that the fraction of Byzantine replicas (B) are bounded by $B < q_c + q_r - 1$ and $B \leq 1 - q_c$, so $B \leq q_r/2$. Thus, as $q_r$ decreases, Byzantine fault tolerance decreases. Moreover, since the total fault tolerance is $q_c + q_r - 1$, a lower $q_r$ also tolerates a smaller fraction of total faults for a fixed $q_c$.

For $q_r \geq \tfrac{2}{3}$ or for clients believing in synchrony, no value of $q_r$ is Pareto optimal. For clients with partial-synchrony assumptions, as $q_r$ increases, the total fault tolerance for safety increases. But since $q_c \geq q_r$, this leads to $B \leq 1 - q_r$, and hence the Byzantine tolerance for liveness decreases. For clients believing in synchrony, the total fault tolerance for safety is $< q_r$ and the Byzantine fault tolerance for liveness is $\geq 1 - q_r$. In both cases, the choice of $q_r$ represents a safety-liveness trade-off.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)–CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims.

In the claims, elements and/or steps do not imply any particular order of operation, unless explicitly stated in the claims.

Many variations, modifications, additions, and improvements are possible. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method of approving a transaction in a replicated service according to a first protocol or a second protocol, the replicated service comprising N replicas deployed on compute nodes of a computer network, N being a positive integer, a client of the replicated service attempting the transaction, the method comprising:
    exchanging, among the replicas over the computer network, first votes on a value for the transaction, the value proposed by a leader of the replicas;
    generating, at the replicated service in response to the exchange of the first votes, a plurality of certificates, each of the plurality of certificates certifying the proposed transaction upon receiving qr*N of the first votes at a respective one of the replicas, where qr is a fractional value between 0 and 1 and represents a quorum required for certification;
    receiving, at the client over the computer network, at least a portion of the plurality of certificates from the replicated service;
    selecting, at the client, a first protocol or a second protocol to approve the transaction;
    wherein, when operating under the first protocol, the client approves the transaction upon determining that at least qc*N certificates have been received, where qc is a fractional value between 0 and 1 that represents a quorum required for transaction approval and qc>qr;
    wherein, when operating under the second protocol, the client approves the transaction upon determining that at least qr*N certifications have been received at the end of the time period equal to 2*Δ, where Δ represents a network delay between two compute nodes of the computer network; and
    transmitting an approval of the transaction from the client to the replicated service for recording by the replicas.

2. The method of claim 1, further comprising:
    setting the fractional value qc based on an expected number of alive-but-corrupt replicas and Byzantine replicas.

3. The method of claim 2, wherein qc is set such that the expected number of alive-but-corrupt replicas and Byzantine replicas is less than (qc+qr−1)*N.

4. The method of claim 1, further comprising:
    setting Δ based on an expected maximum network delay between two compute nodes of the computer network.

5. The method of claim 1, wherein the transaction approval, when operating under the second protocol, is not transmitted if at least qr*N second votes have been received during but not at the end of the time period equal to 2*Δ.

6. The method of claim 5, wherein the number of first votes change when one or more of alive-but-corrupt replicas and Byzantine replicas withdraw the first vote.

7. The method of claim 6, wherein
    the first vote is a YES vote, and
    the alive-but-corrupt replicas and the Byzantine replicas withdraw the first vote by transmitting a NO vote in place of the YES vote.

8. The method of claim 1, wherein the transaction proposal is for a monetary transaction, and wherein the client sets qc based on an amount of the monetary transaction.

9. The method of claim 1, wherein the transaction proposal is for a block chain transaction.

10. A non-transitory computer-readable medium comprising instructions that are executable on a processor of a computer system, wherein the instructions when executed on the processor cause the computer system to carry out a method of approving a transaction in a replicated service according to a first protocol or a second protocol, the replicated service comprising N replicas deployed on compute nodes of a computer network, N being a positive integer, a client of the replicated service attempting the transaction, the method comprising:
    exchanging, among the replicas over the computer network, first votes on a value for the transaction, the value proposed by a leader of the replicas;
    generating, at the replicated service in response to the exchange of the first votes, a plurality of certificates, each of the plurality of certificates certifying the proposed transaction upon receiving qr*N of the first votes at a respective one of the replicas, where qr is a fractional value between 0 and 1 and represents a quorum required for certification;
    receiving, at the client over the computer network, at least a portion of the plurality of certificates from the replicated service;
    selecting, at the client, a first protocol or a second protocol to approve the transaction;
    wherein, when operating under the first protocol, the client approves the transaction upon determining that at least qc*N certificates have been received, where qc is a fractional value between 0 and 1 that represents a quorum required for transaction approval and qc>qr;
    wherein, when operating under the second protocol, the client approves the transaction upon determining that at least qr*N certifications have been received at the end of the time period equal to 2*Δ, where Δ represents a network delay between two compute nodes of the computer network; and
    transmitting an approval of the transaction from the client to the replicated service for recording by the replicas.

11. The non-transitory computer-readable medium of claim 10, wherein the method further comprises:
    setting the fractional value qc based on an expected number of alive-but-corrupt replicas and Byzantine replicas.

12. The non-transitory computer-readable medium of claim 11, wherein qc is set such that the expected number of alive-but-corrupt replicas and Byzantine replicas is less than (qc+qr−1)*N.

13. The non-transitory computer-readable medium of claim 10, wherein the method further comprises:
    setting Δ based on an expected maximum network delay between two compute nodes of the computer network.

14. The non-transitory computer-readable medium of claim 10, wherein the transaction approval, when operating under the second protocol, is not transmitted if at least qr*N second votes have been received during but not at the end of the time period equal to 2*Δ.

15. The non-transitory computer-readable medium of claim 10, wherein the transaction proposal is for a monetary transaction, and wherein the client sets qc based on an amount of the monetary transaction.

16. The non-transitory computer-readable medium of claim 10, wherein the transaction proposal is for a block chain transaction.

17. A computer system for approving a transaction in a replicated service according to a first protocol or a second protocol, the replicated service comprising N replicas deployed on compute nodes of a computer network, N being a positive integer, a client of the replicated service attempting the transaction, the computer system comprising a processor programmed to carry out the steps of:
  exchanging, among the replicas over the computer network, first votes on a value for the transaction, the value proposed by a leader of the replicas;
  generating, at the replicated service in response to the exchange of the first votes, a plurality of certificates, each of the plurality of certificates certifying the proposed transaction upon receiving qr*N of the first votes at a respective one of the replicas, where qr is a fractional value between 0 and 1 and represents a quorum required for certification;
  receiving, at the client over the computer network, at least a portion of the plurality of certificates from the replicated service;
  selecting, at the client, a first protocol or a second protocol to approve the transaction;
  wherein, when operating under the first protocol, the client approves the transaction upon determining that at least qc*N certificates have been received, where qc is a fractional value between 0 and 1 that represents a quorum required for transaction approval and qc>qr;
  wherein, when operating under the second protocol, the client approves the transaction upon determining that at least qr*N certifications have been received at the end of the time period equal to 2*Δ, where Δ represents a network delay between two compute nodes of the computer network; and
  transmitting an approval of the transaction from the client to the replicated service for recording by the replicas.

18. The computer system of claim 17, further comprising:
  setting the fractional value qc based on an expected number of alive-but-corrupt replicas and Byzantine replicas,
  wherein qc is set such that the expected number of alive-but-corrupt replicas and Byzantine replicas is less than (qc+qr−1)*N.

19. The computer system of claim 17, further comprising:
  setting Δ based on an expected maximum network delay between two compute nodes of the computer network.

20. The computer system of claim 17, wherein the transaction approval, when operating under the second protocol, is not transmitted if at least qr*N second votes have been received during but not at the end of the time period equal to 2*Δ.

* * * * *